Jan. 18, 1944.    W. H. TEARE    2,339,663
VACUUM CONDENSER
Filed July 1, 1941
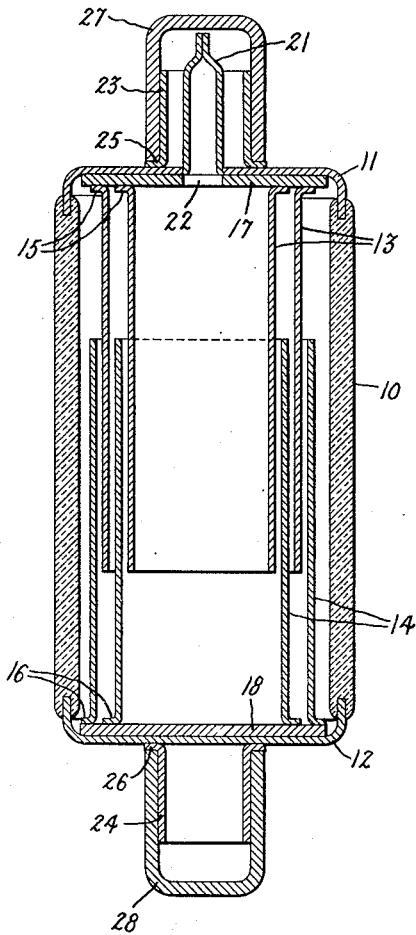
Inventor:
William H. Teare,
by Harry E. Dunham
His Attorney.

Patented Jan. 18, 1944

2,339,663

UNITED STATES PATENT OFFICE 2,339,663

VACUUM CONDENSER

William H. Teare, Schenectady, N. Y., assignor to General Electric Company, a corporation of New York Application July 1, 1941, Serial No. 400,580

5 Claims. (Cl. 175—41)

The present invention relates to condensers, and more particularly to condensers of the type in which the electrodes are arranged within an evacuated housing.

It is an object of the invention to provide a vacuum condenser comprising a relatively few parts and which may be constructed at a comparatively low cost.

It is also an object of the invention to provide a condenser of the foregoing type having a new and improved arrangement of electrodes and supporting means therefor.

It is a further object of the present invention to provide a vacuum condenser of a fixed capacitance type having electrodes of a simple and rugged design and which are mounted in such a manner that the predetermined capacitance rating of the device will be maintained even throughout rough handling thereof.

For a consideration of what I believe to be novel and my invention, attention is directed to the following description taken in connection with the accompanying drawing while the features of novelty which characterize the invention will be pointed out with greater particularity in the appended claims.

The single figure of the drawing is a cross-sectional view through a vacuum condenser constructed in accordance with one form of the invention.

The condenser of the illustrated embodiment is enclosed within an hermetically sealed container formed by an insulating cylinder 10 having opposite metal end caps 11 and 12. The end caps in this instance are of a cup shape having a flat wall portion and a cylindrical peripheral flange, the flange being sealed into the end of the insulating cylinder. The cylinder 10 may be of any suitable material, for example, glass. It will be understood, of course, that the specific types of glass as well as the metal for the end caps 11 and 12 are so selected that a satisfactory seal may be made therebetween.

Supported from the inner surface of the end caps 11 and 12 are a plurality of axially centered and concentrically spaced tubular or cylindrical electrodes 13 and 14, respectively. The electrodes extending toward each other from the opposite end caps are telescopically interleaved in a spaced relation, the amount of overlap being determined by the particular capacitance rating for the device. While in the instant embodiment the condenser comprises but two pairs of interleaved electrodes, it will be obvious that a greater or lesser number may be provided, as desired. The electrodes themselves are preferably made from a relatively heavy metal sheet stock which when rolled into a cylindrical shape forms a relatively rigid element. It is to be understood, of course, that the electrodes may be made from lengths of drawn tubing. During the manufacture of the electrode elements each is provided with an outwardly extending end flange as indicated at 15 and 16 for the electrodes 13 and 14, respectively. These flanges are spot welded to suitable metal backing disks 17 and 18, preferably one at a time, starting with the innermost electrode. By means of a suitable jig the correct spacing between the electrodes may be maintained accurately during the welding operation. The electrode assemblies are suitably secured to the inner flat surface of the end caps 11 annd 12 such as by spot welding. It will be understood that the electrodes 13 and 14 may, if desired, be welded directly to the inner end wall of the end caps themselves rather than through the intermediary of the backing disks 17 and 18.

One of the end caps, such as 11, is provided with an exhaust tube 21 which is shown sealed off and which communicates with the interior of the container through opening 22 provided in the backing disk 17.

Extending axially outwardly from the opposite end caps 11 and 12 are cylindrical members 23 and 24 which are provided with end flanges 25 and 26, respectively, by which they are secured as by spot welding or brazing to the corresponding end caps. Inverted cup-shaped elements 27 and 28 fitting closely over the cylindrical members 23 and 24, respectively, are secured thereto as by soldering to form symmetrical end terminals for the device. The cup-shaped terminal element 27, it will be observed, encloses the sealed-off exhaust tube 21 thereby improving the appearance for the device.

The simplicity of the various component parts of the condenser described and the relative ease with which they may be assembled into the finished unit will be apparent to one skilled in the art. The opposite end units including the electrode assemblies and end caps are first built up and then mounted in a suitable jig by means of the axially extending cylindrical members 23 and 24. The insulating cylinder 10 may also be mounted in a suitable holder in axial alignment with the two end units which are then inserted into the opposite ends of the cylinder. Heat is simultaneously applied to the opposite end edges of the cylinder 10 and the flanges of the end caps, and at the proper temperature of these parts the end units are moved together into engagement with the opposite ends of the cylinder 10 and sealed thereto. The overlapping relation of the condenser electrodes 13 and 14 and the proper concentrically spaced relation may be accurately controlled. The device may then be evacuated by means of a suitable pump connected to the exhaust tube 21 following which the tube is sealed off. The terminal caps 27 and 28 are then soldered over the cylindrical members 23 and 24 completing the unit.

The vacuum condenser constructed as described is of a relatively rugged design and yet because of its ease of manufacture, the electrical characteristics for the device may be controlled with a relatively high degree of accuracy.

Having described the principles of my invention in what I consider to represent a preferred embodiment thereof, I desire to have it understood that the specific form shown is merely illustrative and that the invention may be carried out in other ways.

What I claim as new and desire to secure by Letters Patent of the United States is:

1. A condenser comprising an evacuated housing including an insulating cylinder and a metal closure for each of the opposite ends of said cylinder, interleaved overlapping concentrically spaced cylindrical electrodes arranged in said cylinder, adjacent electrodes being secured to the opposite of said metal end closures, means on one of said metal closures for sealing off said housing after evacuation, and terminal members secured to and extending outwardly from the outer surface of said metal closures, one of said terminal members enclosing said sealing off means.

2. A condenser comprising an evacuated container including a glass cylinder, a metal end cap for each of the opposite ends of said cylinder, a plurality of concentric tubular electrodes axially arranged in said cylinder, said electrodes being secured at one end to one of said end caps, adjacent electrodes being secured to opposite end caps, means on one of said metal end caps for sealing off said container after evacuation, and terminal members secured to and extending outwardly from the outer surface of said metal end caps, one of said terminal members enclosing said sealing off means.

3. A condenser comprising an evacuated container including an insulating cylinder, a metal end cap for each of the opposite ends of said cylinder, a plurality of concentric tubular electrodes arranged within said cylinder, said electrodes each having a flanged end conductive secured to one of said end caps, the adjacent electrodes being secured to the opposite of said end caps, means on one of said metal end caps for sealing off said container after evacuation and terminal means secured to and extending outwardly from the outer surface of said metal end caps, one of said terminal members enclosing said sealing off means.

4. A condenser comprising an evacuated container including an insulating cylinder, a metal end cap sealed to each of the opposite ends of said cylinder, a plurality of concentric tubular electrodes, each of said electrodes being conductively secured at one end to a metal supporting disk, said disks being conductively secured to said end caps, said insulating cylinder supporting said end caps and the tubular electrodes secured to each in coaxial relation and radially spaced from each other.

5. A vacuum condenser comprising an evacuated container having a pair of opposite metal end walls and an insulating member separating said walls, said end walls being sealed to said insulating member, a plurality of electrodes secured at one end to each of said end walls, the other ends of said electrodes being free and interleaved with the corresponding ends of electrodes secured to the opposite of said end walls, cylindrical members secured to and extending outwardly from the outer surface of said end walls, means on one of said metal end walls and within the adjacent cylindrical member for sealing off said container after evacuation, and cup shaped terminal members fitting over said cylindrical members.

WILLIAM H. TEARE.